T. G. MELLINGER.
INCUBATOR.
APPLICATION FILED FEB. 7, 1911.
1,037,180.
Patented Aug. 27, 1912.
3 SHEETS—SHEET 1.
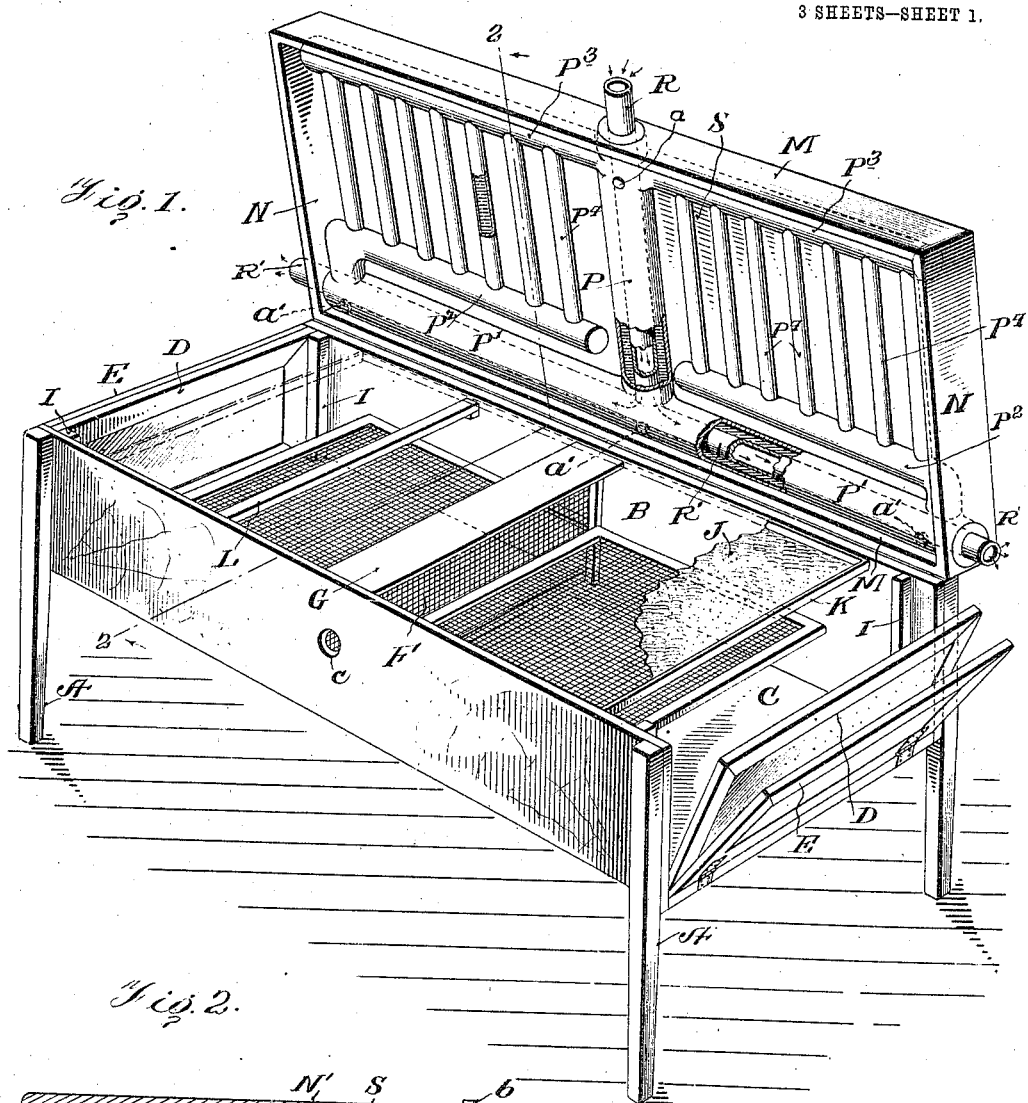
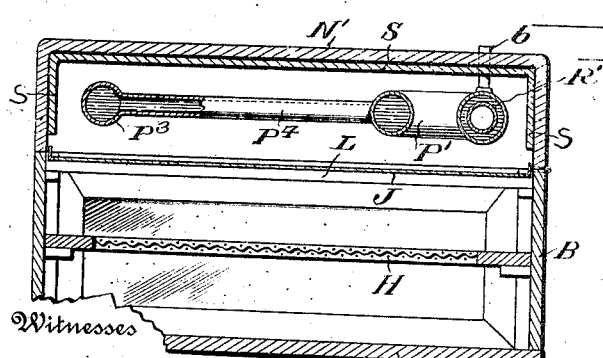
Witnesses
Helgi H. Murray
Charles Delevingne
Inventor
Theodore G. Mellinger.
By M. W. Edmond
Attorney T. G. MELLINGER.
INCUBATOR.
APPLICATION FILED FEB. 7, 1911.
1,037,180.
Patented Aug. 27, 1912.
3 SHEETS—SHEET 2.
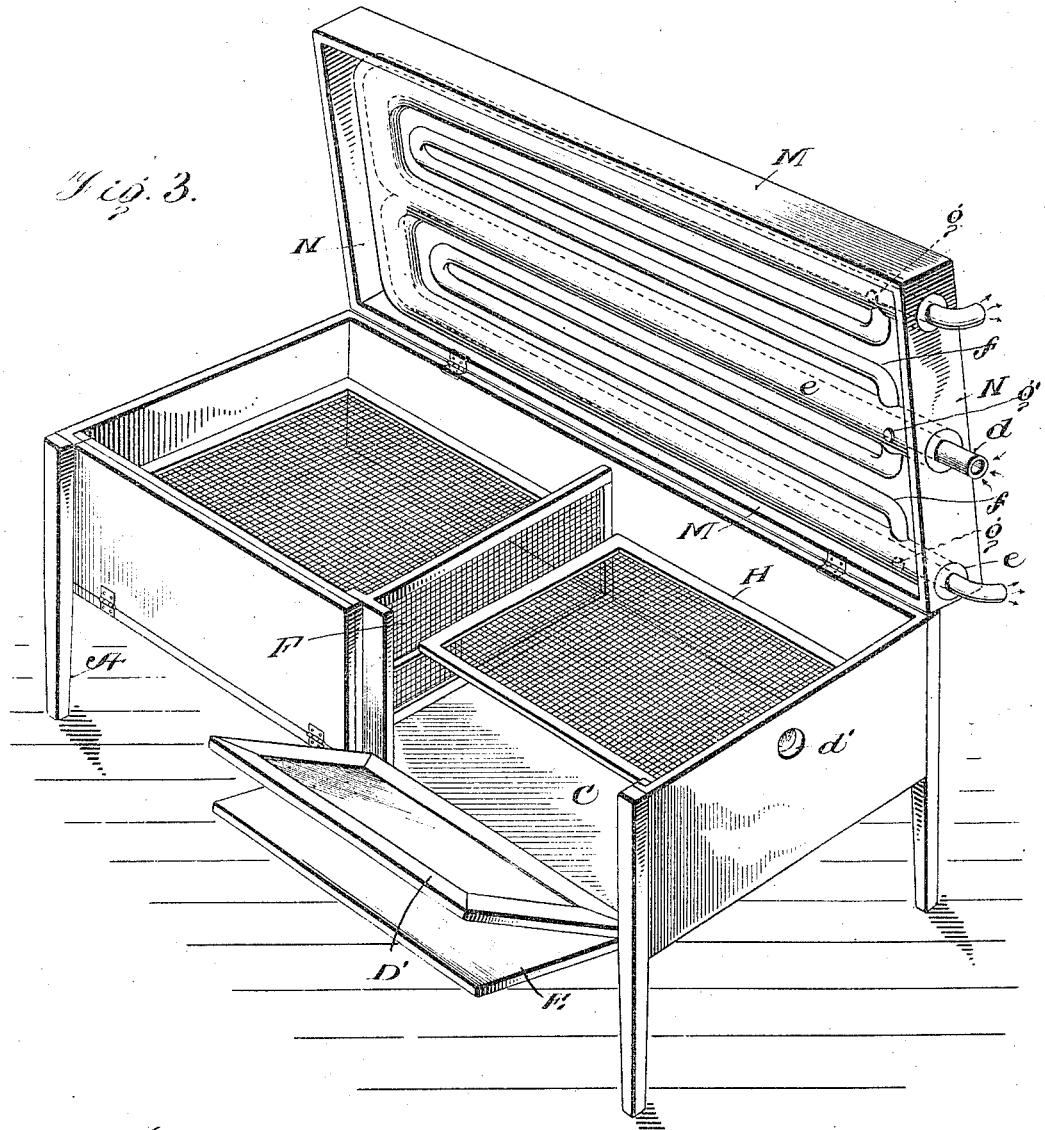
Fig. 3.
Fig. 4.
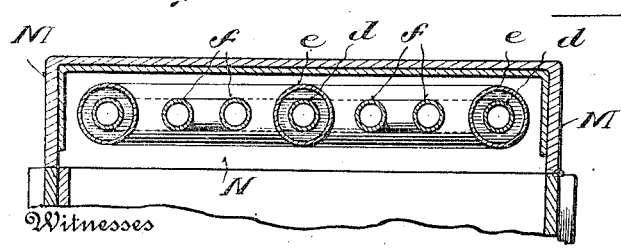
Witnesses
Inventor
Theodore G. Mellinger,
By W. A. Redmond,
Attorney

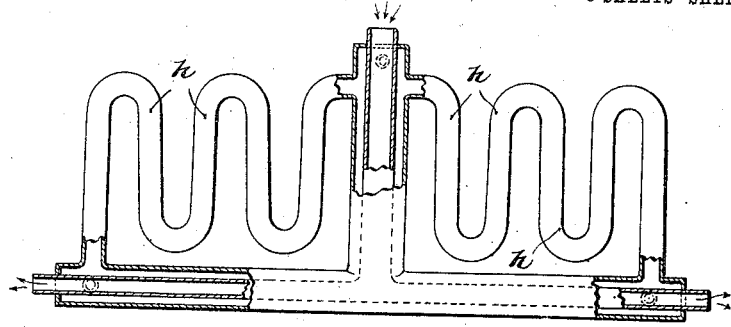
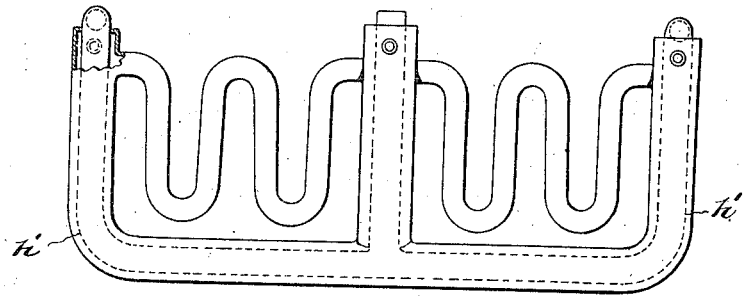
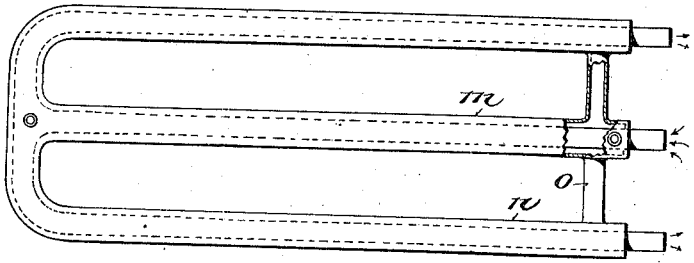
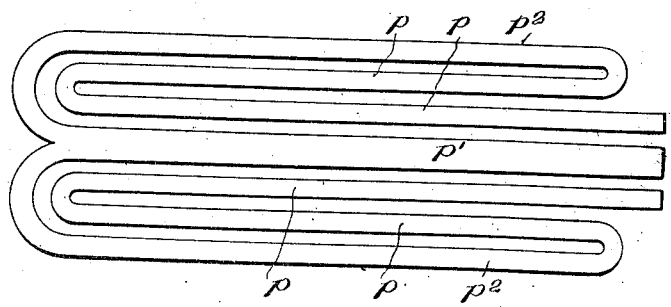

UNITED STATES PATENT OFFICE.

THEODORE GOSHEN MELLINGER, OF WEST HEMPFIELD TOWNSHIP, LANCASTER COUNTY, PENNSYLVANIA, ASSIGNOR OF ONE-HALF TO MARTIN M. HARNISH, OF LANCASTER, PENNSYLVANIA.

INCUBATOR.

1,037,180.   Specification of Letters Patent.   Patented Aug. 27, 1912.

Application filed February 7, 1911. Serial No. 607,133.

*To all whom it may concern:*

Be it known that I, THEODORE GOSHEN MELLINGER, citizen of the United States, residing in West Hempfield township, in the county of Lancaster and State of Pennsylvania, have invented a certain new and useful Incubator, of which the following is a specification.

This invention relates to incubators, and it has for its object to provide a durable, efficient, comparatively inexpensive, and sanitary incubator, the parts of which are simple in construction and arrangement, and which may be quickly and readily inspected without liability to loss of heat, or the entrance of cooling air, and the entire interior of the incubator rendered accessible for the purpose of cleaning and for the removing of any removable part thereof for repair; also a further object is to provide a simple and highly efficient heating system for applying the heat uniformly and evenly, together with means for supplying the necessary moisture, without liability of overheating the eggs, and in further improvements in the construction and arrangements of the parts tending to provide a highly efficient apparatus of such simple construction as to lessen its liability to breakage or to get out of order while in use, and it consists in the parts and combinations of parts hereinafter described and claimed.

In the accompanying drawings, forming a part of this specification, Figure 1 is a perspective view of my improved incubator showing the cover or upper section thereof in a raised or open position. Fig. 2 is a detail vertical section on the line 2—2, Fig. 1, with the cover or upper section in its closed position. Fig. 3 is a perspective view of an incubator embodying my invention in a modified form. Fig. 4 is a detail vertical section through the upper section or cover shown in Fig. 3. Figs. 5, 6, 7, and 8 are detail views, in plan, of modified forms of the coils of my heating system.

Similar letters refer to similar parts throughout all the views.

Referring to the drawings my improved incubator is shown as rectangular in shape and supported by legs A, and the body or lower section thereof as formed by the front and rear walls B, the bottom or flooring C, and referring more particularly to Fig. 1, the doors D and E which form the walls at each end. The body or lower section thus formed is divided by a vertical central partition F into two compartments or chambers, said partition being composed of reticulated material, secured in a suitable frame, through which the heated air may readily pass from one compartment or chamber to the other. Arranged above and resting on the frame of said partition is a wide distributing plate G which extends from front to rear wall and is secured in place in any preferred or suitable manner. At a suitable distance above the bottom or flooring C a tray H, also of reticulated material, is arranged and supported in each of the compartments or chambers of the lower section to form a support for the eggs to be hatched, said trays being of less width than the width of the chambers or compartments so that newly hatched chicks may drop thereoff and into the nurseries formed by the space under said trays. As above stated each end of the lower section is closed by two doors, the inner doors, D, being of glass, and the outer doors, E, of wood or other suitable material. The doors D are hinged to the bottom or flooring C, and drop open outwardly, while the doors E are hinged to the edge of the bottom or flooring so as to drop or open outwardly, and both are made to fit closely between the contiguous faces of the front and rear walls of said lower section, and against jambs I which limit their inward movement. Suitable bolts or catches may be employed to fasten the doors in place while in their closed positions.

Arranged above the trays and extending from side to side and end to end of the lower section so as to cover both the chambers or compartments thereof is a frame K filled with any suitable or preferred porous fabric J, such as muslin, through which the heated air is equally distributed to the compartments or chambers and over the eggs on the trays therein. A bar L is arranged transverse one of the chambers or compartments and serves as a support for a thermometer, not shown.

The upper section or cover of my incubator is rectangular or box-like in form to correspond to the lower section, to the rear wall of which it is hinged, and it is composed of the front and rear walls M, the end walls N and the top N'. Within the cover or upper section is arranged the heating system. The advantage of this arrangement is obvious—the whole system being readily exposed by simply lifting or tilting the cover up so that all parts thereof are accessible for cleaning or for repairs. Referring particularly to Figs. 1 and 2, the heating system consists of a main hot water tube or pipe P having the branches P' extending at right angles therefrom at one end, both the main and its branches being of the same diameter and forming a water jacket for the hot air or heating pipes, to be described. To the branch pipes P' near their outer or free ends is connected the smaller pipes $P^2$ which return or extend inwardly parallel with pipes P' toward the main pipe P, and which is connected to similar pipes $P^3$ extending laterally from opposite sides of the free end of the main pipe P, and with which they communicate by a series of small pipes or tubes $P^4$. The free ends of the pipes $P^2$ and $P^3$ are sealed.

Entering the free end of the main pipe P and extending therethrough is a hot air pipe or tube R, which is formed or provided with lateral branches R' which extend through the water branches P' to the atmosphere. The end of the main pipe P is fitted in an opening in the front wall of the cover or upper section and is sealed water-tight around the hot air pipe R, while the branches P' are fitted to openings in the ends of the cover and are sealed water-tight around the ends of the branch pipes R'. Thus the pipes or tubes R and R' are completely surrounded by water, and the latter is heated therefrom. An opening $a$ is formed in the main pipe P for draining the same and a suitable draw-off cock or hose bib may be connected therewith.

Filling and water leveling openings $a'$, as indicated in dotted lines, are formed in the branches P' to which short lengths of pipes $b$ may be connected through openings in the cover and to which suitable valves or cocks are connected to prevent leakage and evaporation of the water.

The heated air or gas is supplied to the pipe R through its outer end and passes therethrough and into the branches R' and escapes through the open ends of the latter to the atmosphere as indicated by the arrows. This arrangement insures a perfect draft.

The water in the main pipe P and the branches P' is heated by contact with the hot air pipes R and R', and is thus caused to circulate, the course followed being from the main pipe P, through branches P', through pipes $P^2$, and the series of pipes or tubes $P^4$, to the laterals $P^3$, and through the latter back to the main pipe P.

The cover or upper section is lined at the sides and back with sheet metal S the purpose of which is to prevent loss of heat and to reflect the same downwardly. The distributing plate G is also formed of metal and serves to diffuse and prevent the intense heat radiating from the main pipe P striking directly on the eggs.

A ventilating opening $c$ is formed in the front wall or lower section of the body of the incubator.

My invention as above described is well adapted for the purposes for which it is designed, but changes may be made therein without departing from the scope or spirit of my invention, and in Fig. 3 is shown a modified form of construction of the lower section or body portion of the incubator in which the doors D' and E' are arranged to form the front wall of said section, there being a pair for each chamber or compartment, and the ends of said section being fixed, and one of them being formed with a ventilating opening $d'$. Also, as shown in said figure, a modified form of the heating system is employed in which the hot air pipe $d$ extends longitudinally, instead of transversely, of the cover, and divides and returns on itself and opens to the atmosphere through upwardly curved ends at the same end of the cover as that at which the hot air enters, instead of at opposite ends, as in Fig. 1. The water pipe or tube $e$, in this instance, is sealed around pipe $d$ at its point of entrance, extends longitudinally of the cover, divides and returns to the opposite end of the cover, and is sealed around the branches of the pipe $d$. Between the main and branch water pipes are coils $f$ the ends of which communicate with the main pipe on opposite sides thereof and with the branches so that a circulation is maintained between the main water pipe and its branches.

The openings $g$, indicated in dotted lines, are for connection with a water supply and the opening $g'$ is a drainage port.

In Fig. 5 I show another modification of my heating system which differs from that shown in Fig. 1 in that the coils $h$ are shown in a continuous series instead of parallel, the operation and result being practically the same in both forms or arrangements.

In Fig. 6 is shown a system of heating similar to those shown in Figs. 1 and 5 excepting that both the hot air pipes and the water pipes are given right angled turns or bends, as at $h'$, and continued parallel with the main pipes transverse the cover.

In Fig. 7 is shown a modified form of heating system of great simplicity and which differs from the form shown in Fig.

3, in that short tubes o connect the main pipe m and the branches n, instead of having a longitudinally extending coil or return pipe, as in Fig. 3.

In Fig. 8 the heating system shown is the same as that shown in Fig. 7 except that the coils are lengthened so as to form the intermediate coils p between the main p' and branch pipes p².

Among the advantages of an incubator constructed according to my invention are, first, the equal distribution of heat and the high efficiency; second, ready access to its interior for cleaning or repair; and third, the simple but effective means for supplying the necessary humidity, all of which features tend to insure a sanitary and efficient apparatus.

Having thus described my invention what I claim as new is:

1. An incubator, comprising an upper and lower section hinged together, a heating system arranged in said upper section, said system consisting of hot air pipes surrounded by a water jacket, a reticulated partition dividing said lower section into compartments, a distributing plate for diffusing the heat arranged parallel with and over said partition, and a porous cover extending over said compartments.

2. An incubator, comprising an upper section, a heating system arranged in said upper section, said system comprising hot air pipes surrounded by a water jacket consisting of main and lateral pipes, a lower section, a reticulated partition dividing said lower section into chambers or compartments, a distributing plate arranged below the main water pipe for diffusing the heat therefrom, and a porous cover for said chambers or compartments.

In testimony whereof, I affix my signature, in the presence of two witnesses.

THEODORE GOSHEN MELLINGER.

Witnesses:
 MARTIN M. HARNISH,
 JOHN D. PYOTT.

Copies of this patent may be obtained for five cents each, by addressing the "Commissioner of Patents, Washington, D. C."